C. C. SMITH.
VEHICLE-SPRING.

No. 176,082          Patented April 11, 1876.

Witnesses.
Sam'l M. Barton
A. E. Denison

Inventor:
C. C. Smith.
by his Attys.
Carroll D. Wright & Brown.

UNITED STATES PATENT OFFICE.

CHARLES C. SMITH, OF STOCKBRIDGE, VERMONT.

IMPROVEMENT IN VEHICLE-SPRINGS.

Specification forming part of Letters Patent No. 176,082, dated April 11, 1876; application filed December 21, 1875.

*To all whom it may concern:*

Figure 1:
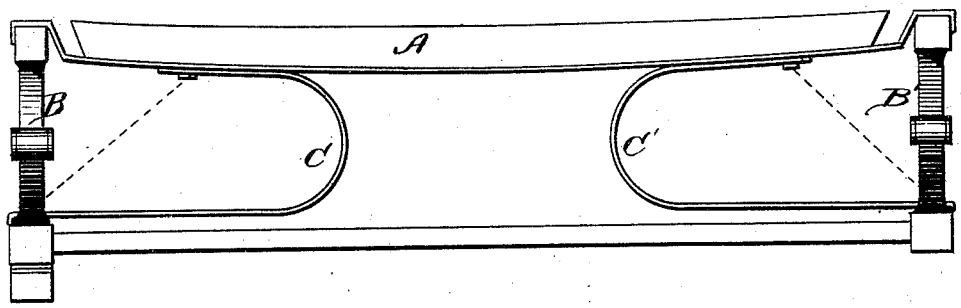
Figure 2:
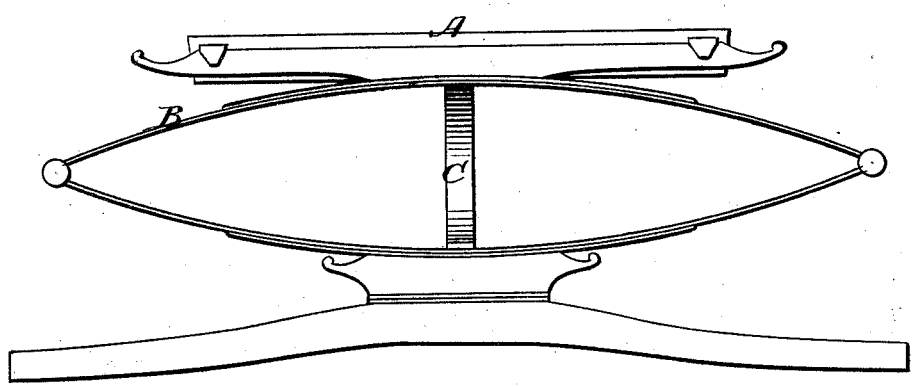

Be it known that I, CHARLES C. SMITH, of Stockbridge, in the county of Windsor and State of Vermont, have invented certain Improvements in Vehicle-Springs, of which the following is a specification:

In the accompanying drawing, forming a part of this specification, Figure 1 represents a side elevation of a vehicle body provided with my invention. Fig. 2 represents an end elevation of the same.

This invention consists in securing the body of a vehicle directly to curved plate-springs, which are interposed between said body and the usual elliptic supporting-springs, and serve to relieve the vehicle of the light jarring or jolting which would not affect or be taken up by the said elliptic springs, and also to break the force of violent jolting more effectually than is done by the ordinary arrangement.

In the drawings, A represents a vehicle-body of any suitable pattern and construction. B B' represent the transverse elliptic springs, which support the body A, said springs being supported, respectively, by the rear axle and bolster in the usual manner. C C' represent plate-springs, which are preferably of U shape. The spring C is rigidly attached at one end to the lower part of the forward elliptic spring B, or to the support thereof, and at the other end to the bottom of the body A, while the spring C' is similarly connected to the rear elliptic spring B' and the body A, as shown in Fig. 1. The springs C C' are located substantially at right angles with the elliptic springs B B', and parallel with the line of motion of the vehicle, and are both preferably in the same longitudinal plane, and under the longitudinal center of the body A. Each of the brace-springs is preferably located in a position the reverse of the position of the other, for the sake of convenience in disposing of them under the body, as shown, and each has a somewhat extended bearing on the bottom of the body. The ends of the brace-springs, which are attached to the elliptic springs or to the supports thereof, are prolonged beyond the ends which are attached to the body A, so that a right line drawn from one point of attachment to the other of each curved plate-spring will be diagonal to the horizontal line of motion of the vehicle, as shown in dotted lines in Fig. 1, (when the construction of the vehicle is such as to elevate the bottom of the body above the bearings or supports of the springs,) and substantially at right angles with the major axes of the elliptic springs.

The curved plate-springs, being lighter and more flexible than the main elliptic supporting-springs, prevent the body of the vehicle from being affected by light jolting, which would be communicated to it through said elliptic springs; and also serve to counteract that portion of violent jolting which would be felt by the wagon-body were the elliptic springs connected directly thereto, owing to the comparative rigidity of said springs, resulting from the requirement of great strength in their construction.

This arrangement, it will be seen, reduces the jolting of a wagon to a practically inappreciable degree.

The curved plate-springs may be sold as an article of manufacture, can be applied by an ordinary mechanic, and are extremely simple and cheap in their construction. They may be attached to the lower portions of the elliptic springs, or to the supports thereof, by hinged joints, for the purpose of relieving said brace-springs under heavy pressure.

Having now fully described my invention, I claim—

The combination of elliptical springs B B' and U-shaped auxiliary springs C C', forming the direct foundation of the wagon-body, and to which only said body is bolted.

In testimony whereof I have signed my name to this specification in the presence of two subscribing witnesses.

CHARLES C. SMITH.

Witnesses:
CHARLES F. BROWN,
A. E. DENISON.